United States Patent [19]

Biondetti et al.

[11] Patent Number: 4,686,005

[45] Date of Patent: * Aug. 11, 1987

[54] METHOD OF WASHING STOCK SUSPENSIONS BY REMOVING UNDESIRED MATERIAL THROUGH AN ENDLESS REVOLVING WIRE

[75] Inventors: Mario Biondetti, Schio, Italy; Roland Baur, Weingarten, Switzerland

[73] Assignee: Escher Wyss GmbH, Ravensberg, Fed. Rep. of Germany

[ * ] Notice: The portion of the term of this patent subsequent to Feb. 26, 2002 has been disclaimed.

[21] Appl. No.: 685,760

[22] Filed: Dec. 24, 1984

Related U.S. Application Data

[63] Continuation-in-part of Ser. No. 405,525, Aug. 5, 1982, Pat. No. 4,501,040, which is a continuation of Ser. No. 226,200, Jan. 19, 1981, abandoned.

[30] Foreign Application Priority Data

Feb. 6, 1980 [CH] Switzerland .......................... 931/80

[51] Int. Cl.⁴ ............................................. D21C 9/06
[52] U.S. Cl. ........................................... 162/60; 8/156; 68/22 R; 68/45; 162/56; 162/190; 162/318; 210/401; 210/783
[58] Field of Search ............... 162/203, 208, 210, 217, 162/190, 303, 304, 306, 310, 264, 275, 276, 312, 318, 335, 357, 55, 56, 191; 68/45, 22 R; 210/400, 401, 408, 783, 409; 8/156

[56] References Cited

U.S. PATENT DOCUMENTS

| | | | |
|---|---|---|---|
| 3,056,719 | 10/1962 | Webster | 162/203 |
| 3,543,834 | 12/1970 | Stuebe | 162/303 |
| 3,616,660 | 11/1971 | Ingermarsson | 60/22 R |
| 3,741,388 | 6/1973 | Takahashi | 210/400 |
| 3,846,232 | 11/1974 | Kankaanpaa | 162/357 |
| 3,878,698 | 4/1975 | Friksson et al. | 68/22 R |
| 3,923,595 | 12/1975 | Tokuno | 162/318 |
| 4,024,015 | 5/1977 | Kankaanpaa | 162/357 |
| 4,028,174 | 6/1977 | Myren | 162/264 |
| 4,096,028 | 6/1978 | Rosenberger | 162/60 |
| 4,115,188 | 9/1978 | O'Brien et al. | 162/190 |
| 4,153,504 | 5/1979 | Justus | 162/203 |
| 4,292,123 | 9/1981 | Lintunen et al. | 162/60 |

Primary Examiner—Steve Alvo
Attorney, Agent, or Firm—Werner W. Kleeman

[57] ABSTRACT

A method of, and washing machine or washer for, washing stock suspensions, wherein a rotatable cylinder having a solid smooth surface is encircled along a portion of its circumference by a movable endless wire or filter band. The stock suspension to be dewatered and washed is infed by a flat jet nozzle between the rotatable solid cylinder and the movable endless wire. The fiber web formed between the rotatable solid cylinder and the movable endless wire has a weight of less than 100 grams per square meter, preferably 30 to 70 grams per square meter. The wire speed and the circumferential speed of the rotatable solid cylinder is in the order of about 400 to 1,200 meters per minute. After throughflow of the stock suspension between the rotatable solid cylinder and the movable endless wire, the dewatered and washed fiber material is removed from the movable endless wire and the rotatable solid cylinder, respectively, collected in a collecting container and delivered for further processing. At least selected portions of the contaminated water removal from the washed fiber material is fed to a clarifier and the clear water recycled back by means of a mixing pump to the washing machine.

8 Claims, 1 Drawing Figure

METHOD OF WASHING STOCK SUSPENSIONS BY REMOVING UNDESIRED MATERIAL THROUGH AN ENDLESS REVOLVING WIRE

CROSS REFERENCE TO RELATED APPLICATION

This application is a continuation-in-part application of our commonly assigned, copending U.S. Application Ser. No. 06/405,525 filed Aug. 5, 1982, entitled "Method and Apparatus for Washing Stock Suspensions by Removing Undesired Material Through an Endless Wire", since granted as U.S. Pat. No. 4,501,040 on Feb. 26, 1985 which, in turn, is a continuation of our commonly assigned, U.S. Application Ser. No. 06/226,200, filed Jan. 19, 1981, now abandoned, and entitled "Filter or Wire Machine."

BACKGROUND OF THE INVENTION

The present invention broadly relates to the papermaking art and, in particular, concerns a new and improved method of, and filter or wire-type washing machine or washer for, washing stock suspensions, which contains a revolving endless movable wire or filter band to which there is infed, in the form of a stock suspension, the material which is to be washed.

During the treatment of aqueous fiber stock suspensions obtained from waste paper there are employed wire or filter devices—sometimes also referred to as screening or sieve devices—means of which the fiber stock suspension is thickened. During an operating procedure, generally referred to as washing, there are thus removed from the stock suspension fine materials or fines such as, for instance, ash or cinder materials, broken fiber pieces and so forth. The known wire or filter devices, for instance inclined wires or filters, curved wires, drum thickeners and so forth, as a washing assembly possess the drawback that their degree of washing or cleaning is extremely limited, and therefore, there are required a number of washing stages with related intermediate thinning of the stock suspension. Additionally, they have a faulty operational reliability since, in particular, the inclined wire and the curved wire are extremely prone to clogging. As a rule, the heretofore known wire or filter devices containing a multi-stage construction require a large amount of space and are accordingly complicated and cumbersome to fabricate and operate.

U.S. Pat. No. 3,616,660, granted Nov. 2, 1971 discloses an apparatus for washing fibrous material which contains a rotatable drum having a perforated shell constituted by a perforated body covered with a foraminous wire. The shell is permeable to liquids but substantially impermeable to the fibrous material undergoing treatment. A foraminous belt in the form of a wire mesh, is looped around the drum surface and moves conjointly therewith. At a point near to where this belt is lead to the drum surface there is provided a curved plate defining in conjunction with the drum surface a web-forming zone. A rigid liquid-pervious member, again for instance a perforated plate, extends from a point adjacent to the end of the curved plate over another portion of the drum surface, and is formed and positioned relative to the drum surface to define a separate washing zone. Such construction of washing apparatus is extremely complicated and requires specially designed components for forming the same. Moreover, the perforated drum is prone to clog, and the lower portion of the drum collects liquid removed from the fibrous material which undesirably can be then reintroduced back into the incoming suspension of fibrous material, thereby rendering more difficult the dewatering and washing of such fibrous material. Also the design is laid out such that the washing liquid must be introduced at a separate location into the washing zone which follows the web-forming zone. At the outlet end of the equipment there is removed the processed web.

SUMMARY OF THE INVENTION

Therefore, with the foregoing in mind, it is a primary object of the present invention to provide a new and improved method of, and washing machine or washer for, washing a stock suspension which does not have associated with it the aforementioned drawbacks and shortcomings of the prior art constructions.

Another and more specific object of the present invention aims at providing a new and improved construction of washing machine which is intended to accomplish the aforementioned purposes, requires very little space and possesses a good dewatering capacity and independent thereof a good cleaning or washing action with high operational reliability of the equipment.

Still a further significant object of the present invention aims at providing a new and improved construction of a wire or filter-type washing machine for use in paper fabrication, which machine is relatively simple in construction and design, quite economical to manufacture, extremely reliable in operation, requires very little maintenance and servicing, and has modest space requirements.

Now in order to implement these and still further objects of the invention, which will become more readily apparent as the description proceeds, the wire or filter-type washing machine or washer of the present development is manifested by the features that there is provided a rotatable cylinder or cylinder member about a portion of whose circumference there is trained or wrapped a movable endless wire or filter band or equivalent structure. An infeed device serves for forming a substantially flat jet of the stock suspension which is directed into a substantially wedge-shaped intermediate space between the rotatable cylinder and the movable endless wire band which travels thereon. This infeed device infeeds the stock suspension such that there is formed between the rotatable cylinder and the movable endless wire band or wire, a fiber web having a weight of less than 100 grams per square meter, preferably 30 to 70 grams per square meter. Drive means cooperate with the movable endless wire and the rotatable cylinder such that the wire speed and the circumferential speed of the rotatable cylinder are in the order of about 400 to 1,200 meters per minute. Also, there may be provided a removal device for the removal of the solid constituents of the stock suspension from the rotatable cylinder and the movable endless wire, respectively, the solid constituents remaining between the rotatable cylinder and the movable endless wire.

As already alluded to above, the invention is not only concerned with the aforementioned apparatus aspects but also to an improved method of washing a stock suspension for removing therefrom undesired materials. This method advantageously comprises the steps of driving a rotatable solid cylinder and an endless revolving wire such that the speed of the endless revolving wire and the circumferential speed of the rotatable solid cylinder is in the order of about 400 to 1,200 meters per minute. There is then infed a stock suspension from which undesired materials are to be removed between the rotatable solid cylinder and the endless revolving wire. Pressure is exerted on the stock suspension located between the endless revolving wire and the surface of the rotatable solid cylinder in order to outwardly express through the endless revolving wire undesired materials contained in the stock suspension while forming a fiber web from the stock suspension between the endless revolving wire and the surface of the rotatable solid cylinder, which fiber web has a weight of less than 100 grams per square meter, preferable 30 to 70 grams per square meter. The fiber web is outfed from between the rotatable solid cylinder and the endless revolving wire at a run-off location of the endless revolving wire from the solid cylinder, and there is then disintegrated the fiber web formed from the stock suspension between the rotatable solid cylinder and the endless revolving wire upon departure of the fiber web from between the rotatable solid cylinder and the endless revolving wire.

In certain of its more specific apparatus aspects, the rotatable cylinder is advantageously constituted by a solid cylinder, thereby eliminating any danger of clogging perforations or the like as would otherwise arise when using a perforated cylinder. Equally, the liquid extracted from the stock suspension cannot pass into the interior of the rotatable solid cylinder where it would be difficult to remove and possibly also could again come into undesirable contact with the stock suspension. The movable endless wire is trained and tensioned against the surface of the rotatable solid cylinder throughout the major part of the web-forming portion or region defined between the run-on and run-off or lift-off location of the wire with respect to the rotatable solid cylinder. The infeed device for forming the substantially flat jet of the stock suspension contains the washing liquid, so that the web-forming portion of region also simultaneously constitutes the actual washing zone for washing the stock suspension. The web formed between the movable endless wire and the rotatable solid cylinder is intentionally destroyed upon its discharge from the equipment.

Advantageously, at least the more contaminated portion of the water of the washed fiber stock suspension and expressed out of the web is returned to a conventional clarifier where it is appropriately processed, so that the fines and other contaminants are removed in the form of a sludge, whereas the clear water is recycled from the clarifier back to the washing machine, preferably first fed to a mixing pump where it is admixed with the infed stock suspension to be washed and then such admixed solution is delivered to the infeed device for forming the aforementioned web. Of course the clear water could be also fed back to the pulper and then likewise recycled to the washing machine. That portion of the less contaminated water expressed out of the web can be recirculated directly back to the pulper or, if desired, to the mixing pump, for subsequent reintroduction to the washing machine. It would be possible, however, to introduce all of the water expressed through the web into the clarifier for processing and ultimate recycling back to the washing machine by means of the mixing pump or pulper, as the case may be. It is even conceivable, particularly in countries or locations where there is an abundance of water, to omit the clarifier and to simply remove the expressed-out water from the system without any recycling back to the washing machine. In such case, the make-up water for the washing machine or washer can be supplied to the stock suspension, for instance, at the pulper.

In the U.S. Pat. No. 3,056,719, granted Oct. 2, 1962, there is disclosed to the art a papermaking machine which contains a cylinder about a portion of whose circumference there is wrapped a wire or filter band. The liquid stock or stock suspension is infed by means of a headbox in the form of a flat jet into a wedge-shaped intermediate space between the cylinder and the wire band which travels thereon. With this machine the formed fiber fleece or web remains at the wire and is dried and processed into paper. Due to the difficulties associated with the detachment of the fiber web from the cylinder, which must possess a solid smooth surface, it has not heretofore been possible to put into actual practice this relatively simple papermaking machine.

On the other hand, with the inventive wire-type washing machine and method of washing stock suspensions, the fiber web formed between the rotatable solid cylinder and the movable or revolving endless wire, following its dewatering, is intentionally destroyed and is further processed in the form of a collected thickened suspension. Therefore it is unimportant whether it remains adhering to the rotatable solid cylinder or the movable endless wire after its passage through the wrap angle of the movable endless wire at the rotatable solid cylinder.

By virtue of the invention there is obtained a novel construction of washing machine and method of operating the same for washing suspensions of fibrous materials which makes use of a basically known principle, and particularly utilizes its advantages while overcoming the drawbacks of the prior art papermaking machine which heretofore precluded adaptation of such prior art equipment into practical applications.

Although in the first instance the inventive washing machine is used for dewatering and washing an aqueous fiber stock suspension obtained from waste paper, it generally also can be employed for filtering other materials which are infed in the form of a suspension in a liquid.

Preferably, the run-on or contact line of the movable endless wire at the rotatable solid cylinder can be located angularly offset at the region of the apex location of the rotatable solid cylinder, and specifically, viewed opposite to the direction of rotation of the rotatable solid cylinder, through an angle which is smaller than 45°. Moreover, the run-off or lift-off location or line of the movable endless wire from the rotatable solid cylinder can be arranged at the region of the lower cylinder half, and specifically, forwardly or upstream of the lowest position of the rotatable solid cylinder viewed in its direction of rotation. Due to these measures it is possible, with a large wrap angle of the filter or wire band at the rotatable solid cylinder, which can amount to preferably 140° to 180°, to obtain a faultless removal of the obtained good stock from the rotatable solid cylinder and from the movable endless wire, augmented by the action of the force of gravity. However, it should be understood that it is conceivable to also employ other angular orientations or positions of the run-on line and the run-off line.

Additionally, the rotatable solid cylinder can be equipped with at least one contact or pressing roll for pressing the movable endless wire against its cylinder surface. In this way there is realized a so-called register roll effect which further augments or enhances the dewatering of the material through the action of a pressure pulse and the formation of a suction action following the pressure location of the contact or pressing roll.

The dewatering of the material remaining upon the movable endless wire or filter following the run-off location can thus be further augmented in that the wire at the region of the run-off or lift-off location from the rotatable solid cylinder, viewed in the direction of movement of such movable endless wire, is equipped with at least one dewatering element.

Preferably, the rotatable solid cylinder can have operatively associated therewith a catch or receiving container which has at least two compartments or chambers which are operatively associated with different portions of the wrap angle of the movable endless wire at the rotatable solid cylinder. The water which is sprayed by the movable endless wire at different portions or sections contains different contaminants and in different densities, so that the waste water effluxing from such chambers can be differently treated. As previously explained, the more contaminated water can be fed, for instance, to a clarifier where the contaminants are removed in the form of a sludge and the clear water recycled back to the washing machine, whereas the less contaminated water can be recycled in the previously explained manner, without passing through the clarifier, back to the washing machine.

Moreover, the catch container can be provided with a perforated partition or separation wall which is pervious for the water. Due to this measure it is possible to undertake, under the action of the kinetic energy of the water, pre-cleaning of such water and, on the one hand, the water which effluxes through the partition wall is partially cleaned and, on the other hand, the eliminated contaminants remaining forwardly of the wire are concentrated.

BRIEF DESCRIPTION OF THE DRAWINGS

The invention will be better understood and objects other than those set forth above, will become apparent when consideration is given to the following detailed description thereof. Such description makes reference to the annexed drawings wherein the single figure schematically illustrates an exemplary embodiment of wire or filter-type washing machine or washer according to the invention and useful for practicing the method aspects of the invention.

DETAILED DESCRIPTION OF THE PREFERRED EMBODIMENT

Figure 1:
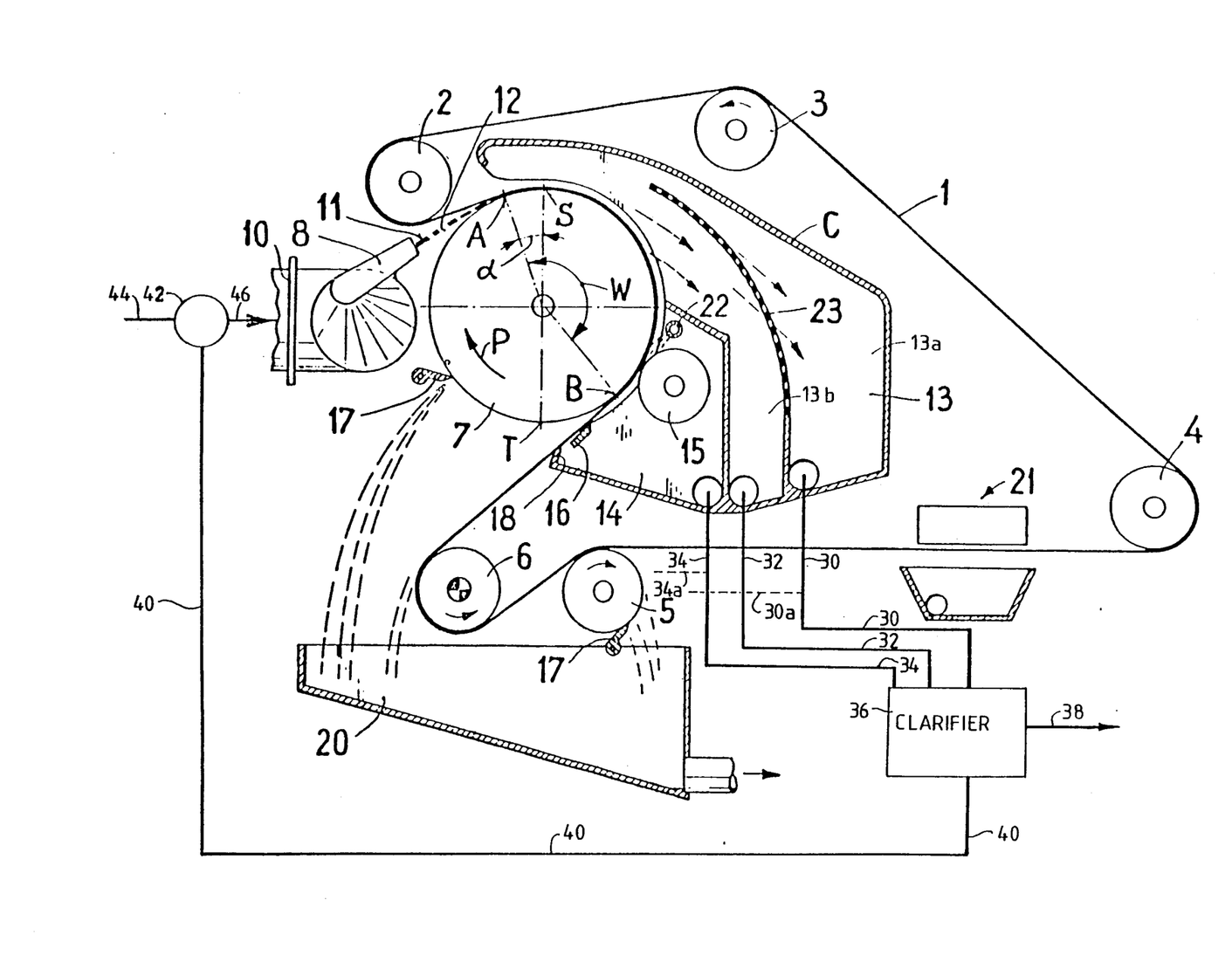

Describing now the drawing, the exemplary embodiment of wire or filter-type washing machine or washer shown in the single figure thereof will be seen to contain a movable wire or filter 1 having the form of an endless revolving band. This movable endless wire 1 is guided over guide rolls 2, 3 and 4, a take-off roll 5, a drive roll or drive means 6, which advantageously may be a regulatable drive for controlling the speed of the movable endless wire 1, and a rotatable solid cylinder or cylinder member 7. This movable endless wire band or movable endless wire 1 travels onto the rotatable cylinder 7, which is shown as a solid cylinder, at a substantially line-shaped run-on location A and travels off of the rotatable solid cylinder 7 at a run-off line or location B.

As will be seen by referring to the drawing, the run-on location A is spaced from the apex portion or location S of the rotatable solid cylinder 7 though an angle α, and specifically opposite to the rotational direction of the rotatable solid cylinder 7 which has been indicated by the arrow P, this rotatable solid cylinder 7 co-rotating with the movable endless wire 1.

The run-off or lift-off location B of the movable endless wire 1 from the rotatable solid cylinder 7 is located at the region of the lower cylinder half, and specifically, viewed in the direction of rotation of the rotatable solid cylinder 7, before its lowest position or location T.

As will be further seen by inspecting the single figure of the drawing, the inventive wire-type washing machine or washer is provided with a stock infeed device comprising a flat jet nozzle 8 which is connected with a suitable tubular conduit or line 10 through which there is infed to the wire-type washing machine the material which is to be sieved or filtered and washed, normally an aqueous fiber stock suspension which is obtained from waste paper and which contains any washing liquid which might be used. The nozzle or nozzle means 8 forms a flat suspension jet 11 which is introduced and directed into a substantially wedge-shaped intermediate space 12 between the movable endless wire 1 and the rotatable solid cylinder 7.

At the region of the wrap angle W of the movable endless wire 1 at the rotatable solid cylinder 7 there is arranged at the rotatable solid cylinder 7 a catch container or receiver C having two chambers 13 and 14 for the expressed or pressed-out water containing the expressed or separated-out contaminants. At the region of the chamber 14 there is operatively associated with the rotatable solid cylinder 7 a press or contact roll 15. It is however possible to dispense with the use of this press or contact roll 15. The catch container C is provided with a dewatering element, such as a suction ledge 16, here shown as a foil, but another equivalent device can be used, following which the movable endless wire 1 is moved over a scraper edge or scraper 18 of the catch container C.

As will also be clearly recognized by inspecting the single figure of the drawing, the rotatable solid cylinder 7 and the take-off roll 5 are provided with scrapers 17 or equivalent structure which ensure that the material respectively adhering at the rotatable solid cylinder 7 and remaining at the movable endless wire band 1 and pressed and removed by the take-off roll 5 is detached from such rotatable solid cylinder 7 and take-off roll 5 and drops into a collecting container 20 from which such removed material can be delivered for further processing. Here also it is possible to dispense with use of such scrapers 17 if desired.

Between the rolls 5 and 4 there is located a cleaning device 21 which, for instance, can contain spray nozzles, scrapers and so forth, and serves for the cleaning of the movable endless wire 1 before the related wire section again arrives at the region of the nozzle 8.

The stock infeed device containing the flat jet nozzle 8 forms from the stock suspension a substantially flat material jet which is directed between the rotatable solid cylinder 7 having the smooth cylinder surface and the movable endless wire 1.

The infed stock suspension thereafter is dewatered and washed by the wire tension at the region of the wrap angle W, and the separated-out water together with the contaminants drops into the chambers 13 and 14. The movable endless wire 1 is tensioned against the surface of the rotatable solid cylinder 7 at least throughout the major part of the web-forming zone located between the wire run-on location A and the wire run-off location B and which zone also defines the washing zone. The two chambers 13 and 14 are preferably provided so that the waste water emanating from two regions or zones, which can contain different properties, can be separately processed. Thus, for instance, the waste water from the chamber or compartment 14 might have less contaminants than the waste water effluxing out of the chamber or compartment 13.

During a typical washing operation, during which an aqueous fiber stock suspension obtained from waste paper is cleaned of the aforementioned contaminants, such as for instance mineral pigments, printing inks, pieces of broken fibers and so forth, the stock suspension to be cleaned or washed is infed through the tubular conduit 10 at a consistency of less than 1.5%, preferably 0.4 to 0.8%.

The wire-type washing machine or washer can be preferably operated during the washing operation such that the fiber web or the like formed between the rotatable solid cylinder 7 and the movable endless wire 1 has a weight of less than 100 grams per square meter, preferably 30 to 70 grams per square meter. The wire speed and the circumferential speed of the rotatable solid cylinder 7 can be in the order of about 400 to 1,200 meters per minute. It has been advantageously shown that when operating the washing machine in this manner, an efficient and effective washing of the fiber stock suspension is obtained. The wrap angle W of the movable endless wire 1 about the rotatable solid cylinder 7, that is to say, the angular spacing of the points A and B from one another, preferably can be in the order of 140° to 180°. It has been beneficially found that by depositing, by means of the infeed device 8, the stock suspension on the movable endless wire 1 such that there is formed a fiber web thereon having a weight less than 100 grams per square meter and by maintaining the wire speed and the circumferential speed of the rotatable solid cylinder 7 in the order of about 400 to 1,200 meters per minute, the conditions are fulfilled for achieving an enhanced washing of the fiber web formed from the infed stock suspension.

The fiber web which is formed between the movable endless wire 1 and the rotatable solid cylinder 7 has a stock density of 5 to 8% and, as already mentioned, during the removal from the rotatable solid cylinder 7 and the movable endless wire 1 as a fiber web is disintegrated or destroyed and then is delivered as a thickened suspension from the collecting container 20 for undergoing a further suitable processing operation.

The contact or press roll 15, during the washing operation, augments the dewatering of the fiber web formed between the movable endless wire 1 and the rotatable solid cylinder 7 due to the so-called register roll effect. After the contact or press location of the contact or press roll 15 there is formed a so-called suction action, so that the free water which is located still in the fiber web and at the movable endless wire 1 adheres to the surface of the contact or press roll 15. In this way there is further augmented the dewatering and washing operation.

The action of the contact or press roll 15, during the washing operation, can be further improved through the provision of a water jet nozzle 22 which, in accordance with the illustration of the drawing, and viewed with respect to the direction of movement of the movable endless wire 1, is located forwardly of the contact or press roll 15. By providing an exactly dimensioned jet of water it is namely possible to flush the fiber material located between the movable endless wire 1 and the rotatable solid cylinder 7 and to loosen such fiber material, whereupon there can be accomplished a further dewatering operation by the contact or press roll 15. If desired, this water jet nozzle 22 may be, however, omitted.

Due to the suction ledge 16 which is arranged after the contact roll 15 there is augmented dewatering of the fiber material which remains at the movable endless wire 1.

The inventive wire-type washing machine is not only suitable for washing fiber material obtained from waste paper, but also can be used for simple thickening of fiber material. In such case the contact or press roll 15 together with the nozzle 22 and also the suction ledge 16 need no longer be used.

However, it should be understood that, on the other hand, there also can be provided more than one contact or press roll 15 or suction ledge 16.

As also will be evident by reverting again to the drawing, the chamber or compartment 13 is subdivided by a wire or filter 23 or equivalent structure into two partial chambers 13a and 13b which can have special outflow or withdrawal lines 30 and 32, respectively. As indicated by the broken arrows, the water which has been propelled from the rotatable solid cylinder 7 can penetrate through the wire or filter 23 into the right-hand portion of the chamber 13, i.e. into the partial chamber 13a, whereas solid particles entrained by the water can remain at the left-hand portion of the chamber 13, i.e. in the partial chamber 13b. Consequently, there is rendered possible a certain pre-cleaning of the water with the aid of its kinetic energy. Also the chamber 14 is provided with an outfeed or withdrawal line 34.

All or selected ones of these outfeed or withdrawal lines 30, 32 and 34 may lead to a suitable clarifier 36 where the water has the contaminants removed therefrom and outfed from the clarifier 36 by means of a discharge line 38 in the form of sludge which is then suitably disposed of, whereas the clear water flows from the clarifier 36 through a discharge line 40 to a mixing pump 42 where it is admixed with the stock to be washed, fed to such mixing pump 42 by a suitable line 44, and then such admixed stock and clear water is fed via a further line 46 to the tubular conduit 10 for recycling back into the washing machine.

The water in the partial chamber 13b may be here assumed to be the most contaminated, whereas the water in the partial chamber 13a and in the chamber 14 is assumed to be less contaminated. Depending upon the degree of contamination of the water in the partial chamber 13a and in the chamber 14 it may be sufficient to only deliver the most contaminated water from the partial chamber 13b via the line 32 to the clarifier 36, whereas the water effluxing from the partial chamber 13a and the chamber 14 may be recycled back directly to the not particularly shown pulper or to the mixing pump 42 via the related lines 30 and 34 and the branch lines 30a and 34a, respectively, shown in broken lines in the drawing. Instead of feeding the clear water via the line or conduit 40 to the mixing pump 42 it also may be recycled back to the washing machine by way of the pulper.

As previously explained, under certain circumstances it may be even possible to omit the clarifier 36, particularly in locations or countries where water is plentiful.

In such case the water effluxing from the partial chambers 13a, 13b and 14 is simply removed, and fresh or make-up washing water may be introduced at the location of the pulper or at any other suitable location.

As far as the spray nozzles 22 are concerned, which also can be provided in a number of rows, such can be arranged at a random location of the wrap angle W of the rotatable solid cylinder 7 by the wire or filter 1. A preferred arrangement, as illustrated, contemplates providing the spray nozzles 22 at a location where there has already been accomplished a partial dewatering of the fiber material, and a further dewatering follows, in the present embodiment under discussion, augmented by the action of the contact roll or cylinder 15. Due to the action of the water jets, as mentioned, there is beneficially accomplished a flushing and loosening of the already partially pressed-out fiber material, something which improves the washing operation.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A method of washing a stock suspension for removing therefrom undesired materials, comprising the steps of:
   driving a rotatable solid cylinder and an endless revolving wire such that the speed of the endless revolving wire and the circumferential speed of the rotatable solid cylinder is in the order of about 400 to 1,200 meters per minute;
   infeeding a stock suspension from which undesired materials are to be removed between said rotatable solid cylinder and said endless revolving wire;
   exerting pressure on the stock suspension located between the endless revolving wire and the surface of the rotatable solid cylinder in order to outwardly express through the endless revolving wire undesired materials contained in the stock suspension while forming a fiber web from the stock suspension between the endless revolving wire and the surface of the rotatable solid cylinder, which fiber web has a weight of less than 100 grams per square meter throughout the thus formed fiber web;
   outfeeding the fiber web from between the rotatable solid cylinder and the endless revolving wire at a run-off location of the endless revolving wire from the solid cylinder; and
   disintegrating the fiber web formed from the stock suspension between the rotatable solid cylinder and the endless revolving wire upon departure of the fiber web from between the rotatable solid cylinder and the endless revolving wire.

2. The method as defined in claim 1, wherein:
   the weight of the fiber web is in the order of between 30 to 70 grams per square meter.

3. The method as defined in claim 1, further including the steps of:
   infeeding the stock suspension in the form of a substantially flat jet to a substantially wedge-shaped space located between the endless revolving wire and the surface of the rotatable solid cylinder at a location upstream of a point where the endless revolving wire runs onto the rotatable solid cylinder.

4. The method as defined in claim 3, wherein:
   said wedge-shaped space is located forwardly of the apex of the rotatable solid cylinder with respect to its direction of rotation and is disposed at the upper half of the rotatable solid cylinder; and
   removing the endless revolving wire from the rotatable solid cylinder at a run-off location disposed forwardly of a lowermost location of the rotatable solid cylinder with respect to its direction of rotation and at the lower half of said rotatable solid cylinder, whereby there is provided a large wrap angle for the endless revolving wire about the rotatable solid cylinder and removal of the fiber web, which is to be disintegrated, from the rotatable solid cylinder and the endless revolving wire is augmented by the action of gravity.

5. The method as defined in claim 1, wherein:
   the stock suspension is formed into the fiber web and washed at a common fiber web forming zone located between a run-on location and a run-off location of the endless revolving wire with respect to the rotatable solid cylinder.

6. The method as defined in claim 1, further including the steps of:
   tensioning the endless revolving wire against the surface of the rotatable solid cylinder throughout a major part of a fiber web forming zone located between a run-on location and a run-off location of the endless revolving wire at the rotatable solid cylinder.

7. A method of washing a stock suspension obtained from waste paper for removing therefrom undesired materials, comprising the steps of:
   driving a rotatable solid cylinder and an endless revolving wire such that the speed of the endless revolving wire and the circumferential speed of the rotatable solid cylinder is in the order of about 400 to 1,200 meters per minute;
   infeeding a stock suspension from which undesired materials are to be removed between said rotatable solid cylinder and said endless revolving wire;
   tensioning the endless revolving wire against the surface of the rotatable solid cylinder throughout a major part of a fiber web forming zone located between a run-on location and a run-off location of the endless revolving wire at the solid cylinder;
   exerting pressure on the stock suspension between the endless revolving wire and the surface of the rotatable solid cylinder by means of the tensioned endless revolving wire in order to outwardly express through the endless revolving wire undesired materials contained in the stock suspension while forming a fiber web from the stock suspension between the endless revolving wire and the surface of the rotatable solid cylinder, said fiber web having a weight of less than 100 grams per square meter;
   employing a contact roll which contacts the endless revolving wire and dewaters the fiber web while being formed between the endless revolving wire and the rotatable solid cylinder in the fiber web forming zone and following said contact roll there is produced a suction action, so that free water still located in the fiber web and at the endless revolving wire adheres to the surface of said contact roll;
   immediately prior to said contact roll flushing fiber material located between the endless revolving wire and the rotatable solid cylinder with a water jet to loosen said fiber material;

outfeeding the fiber web from between the rotatable solid cylinder and the endless revolving wire at said run-off location of the endless revolving wire from the rotatable solid cylinder; and disintegrating the fiber web formed from the stock suspension between the rotatable solid cylinder and the endless revolving wire upon departure of the fiber web from between the rotatable solid cylinder and the endless revolving wire.

8. The method as defined in claim 7, wherein:
the weight of the fiber web is in the order of between 30 to 70 grams per square meter.

* * * * *

UNITED STATES PATENT AND TRADEMARK OFFICE
CERTIFICATE OF CORRECTION

PATENT NO.   : 4,686,005

DATED        : August 11, 1987

INVENTOR(S)  : Mario BIONDETTI and Roland BAUR

It is certified that error appears in the above-identified patent and that said Letters Patent is hereby corrected as shown below:

Title page, line 9, after "GmbH" please delete "Ravensberg" and insert
   --Ravensburg--

Column 3, line 40, after "portion" please delete "of" and insert --or--

Signed and Sealed this

Fifteenth Day of March, 1988

*Attest:*

DONALD J. QUIGG

*Attesting Officer*     Commissioner of Patents and Trademarks

US004686005B1

REEXAMINATION CERTIFICATE (2695th)

United States Patent [19]
Biondetti et al.

[11] B1 4,686,005
[45] Certificate Issued * Oct. 17, 1995

[54] METHOD OF WASHING STOCK SUSPENSIONS BY REMOVING UNDESIRED MATERIAL THROUGH AN ENDLESS REVOLVING WIRE

[75] Inventors: Mario Biondetti, Schio, Italy; Roland Baur, Weingarten, Switzerland

[73] Assignee: Sulzer-Escher Wyss GmbH

Reexamination Request
No. 90/003,131, Jul. 16, 1993
No. 90/003,093, Jun. 9, 1993

Reexamination Certificate for:
Patent No.: 4,686,005
Issued: Aug. 11, 1987
Appl. No.: 685,760
Filed: Dec. 24, 1984

Certificate of Correction issued Mar. 15, 1988.

[*] Notice: The portion of the term of this patent subsequent to Feb. 26, 2002 has been disclaimed.

Related U.S. Application Data

[63] Continuation-in-part of Ser. No. 405,525, Aug. 5, 1982, Pat. No. 4,501,040, which is a continuation of Ser. No. 226,200, Jan. 19, 1981, abandoned.

[30] Foreign Application Priority Data

Feb. 6, 1980 [CH] Switzerland ............... 931/80

[51] Int. Cl.$^6$ ................... D21C 9/06
[52] U.S. Cl. ............... 162/60; 8/156; 68/22 R; 68/45; 162/56; 162/190; 162/318; 210/401; 210/783
[58] Field of Search ............. 162/48, 272, 273, 162/274, 203, 208, 210, 217, 190, 303, 304, 306, 310, 264, 275, 276, 312, 318, 335, 357, 55, 56, 191; 68/45, 22 R; 210/400, 401, 408, 783, 409; 8/156

[56] References Cited

U.S. PATENT DOCUMENTS

| | | |
|---|---|---|
| 1,241,905 | 10/1917 | Behr . |
| 1,295,894 | 3/1919 | Hellmund . |
| 1,595,894 | 8/1926 | Klund . |
| 2,365,658 | 12/1944 | Schumacher . |
| 2,904,495 | 9/1959 | Ferris . |
| 3,056,719 | 10/1962 | Webster . |
| 3,201,305 | 8/1965 | Webster .................. 162/203 |
| 3,923,595 | 12/1975 | Tokuno .................. 162/300 |
| 3,979,296 | 9/1976 | Bastgen . |

FOREIGN PATENT DOCUMENTS

| | | |
|---|---|---|
| 614901 | 2/1961 | Canada . |
| 2183833 | 12/1973 | France . |
| 1036055 | 8/1958 | Germany . |
| 1090963 | 4/1961 | Germany . |
| 50415 | 9/1966 | Germany . |
| 1926516 | 1/1970 | Germany . |
| 2322588 | 11/1973 | Germany . |
| 2047007 | 4/1975 | Germany . |
| 2403662 | 2/1978 | Germany . |
| 2646555 | 4/1978 | Germany . |
| 2645763 | 4/1978 | Germany . |
| 51-49911 | 4/1976 | Japan . |

OTHER PUBLICATIONS

Korhonen, *Pulp and Paper,* "Brownstock Washing: A Review Of Current Technology", Sep. 1979, pp. 104–107.
"Preparation & Treatment of Wood Pulp", Pulp and paper Manufacture, Stephenson, vol. 1, pp. 758, 759 and 772–773 1950.
"Preparation of Stock for Paper Making", Pulp and Paper Manufacture, Stephen, vol. 2, pp. 166–167, 1951.
Beloit Corporation Deinking Manual, Second Edition, Sep. 1979, pp. 1, 4, 17–18.
"The Vario Split, a new machine for improving waste paper stocks", Linck et al, pp. 1–10 (1981).
German Brochure on TISCO-Former, Escher Wyss, 1978.
Report on the Rotary Retiform Process of Paper Making, by David Webster, 1953.
Letter from E. A. Charlton to I. H. Andrews dated Dec. 28, 1954.
Proceedings International Mechanical Pulping Conference, 1977 vol. III, Jun. 8, 1977.
Zellstoff Papier, 1978, p. 310.
A Text–Book of Paper–Making, 1920, pp. 296–297.
Preparation & Treatment of Wood Pulp, 1950, vol. 1, McGraw–Hill, N.Y. pp. 772–773, Stephenson.
David G. Smith, Economic Incentives for Recycling Will Boost Secondary Fiber Use, Paperboard Packaging, Oct. 1979.
Von W. H. Siewert, Qualitätsverbesserung an Papierrohstoffen aus Sekundärfasern durch Entzug von Feinstoff und Asche, Apr. 9, 1977.
Japanese Magazine Pulp and Paper Engineering, 1976 pp. 17–31.
Sieb und Filz, p. 82, Aug. 1968.

*Primary Examiner*—Stephen Alvo

[57] ABSTRACT

A method of, and washing machine or washer for, washing stock suspensions, wherein a rotatable cylinder having a solid smooth surface is encircled along a portion of its circumference by a movable endless wire or filter band. The stock suspension to be dewatered and washed is infed by a flat jet nozzle between the rotatable solid cylinder and the movable endless wire. The fiber web formed between the rotatable solid cylinder and the movable endless wire has a weight of less than 100 grams per square meter, preferably 30 to 70 grams per square meter. The wire speed and the circumferential speed of the rotatable solid cylinder is in the order of about 400 to 1,200 meters per minute. After throughflow of the stock suspension between the rotatable solid cylinder and the movable endless wire, the dewatered and washed fiber material is removed from the movable endless wire and the rotatable solid cylinder, respectively, collected in a collecting container and delivered for further processing. At least selected portions of the contaminated water removal from the washed fiber material is fed to a clarifier and the clear water recycled back by means of a mixing pump to the washing machine.

8 Claims,

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *